United States Patent [19]

Price

[11] 4,427,179

[45] Jan. 24, 1984

[54] LEVELING APPARATUS

[76] Inventor: Franklin F. Price, 3426 Carnegie Dr., Olympia, Wash. 98503

[21] Appl. No.: 391,487

[22] Filed: Jun. 24, 1982

Related U.S. Application Data

[63] Continuation-in-part of Ser. No. 285,530, Jul. 21, 1981, abandoned.

[51] Int. Cl.³ .............................................. E02C 3/00
[52] U.S. Cl. ........................................ 254/88; 33/391
[58] Field of Search .............. 254/88; 188/32; 33/391, 33/370, 333

[56] References Cited

U.S. PATENT DOCUMENTS

| | | | |
|---|---|---|---|
| 824,525 | 6/1906 | Bonney | 33/333 |
| 1,922,551 | 8/1933 | McCosh | 254/88 |
| 2,486,697 | 11/1949 | White | 33/370 |
| 2,527,982 | 10/1950 | Brock | 33/391 |
| 2,675,210 | 4/1954 | Lowber | 254/88 |
| 2,819,529 | 1/1958 | Beck | 251/1 |
| 2,924,427 | 2/1960 | Larson | 254/88 |
| 2,971,264 | 2/1961 | Cowan | 33/333 |
| 3,295,829 | 1/1967 | Tarr | 254/88 |
| 3,916,531 | 11/1975 | Morton | 33/333 |
| 4,108,421 | 8/1978 | Extine | 254/88 |
| 4,165,862 | 8/1979 | Bennett | 254/88 |

FOREIGN PATENT DOCUMENTS

| | | | |
|---|---|---|---|
| 1224046 | 2/1960 | France | 254/88 |

*Primary Examiner*—Robert C. Watson
*Attorney, Agent, or Firm*—Delbert J. Barnard

[57] ABSTRACT

A plurality of ramp planks of a predetermined thickness are stackable on a frame, to determine the height of the ramp. Each successive plank, in the upper direction, is shorter than the one below it. The number of planks utilized determines the height of elevation of the wheel. The degree that a vehicle is off level is measured by an inclinometer carried by the vehicle. The reading on the inclinometer tells the user the number of ramp planks he should use so that when a low side wheel of the vehicle is driven up onto the ramp, the vehicle will be substantially level. Indicia is provided on the ramp planks corresponding to indicia on the inclinometer.

3 Claims, 11 Drawing Figures

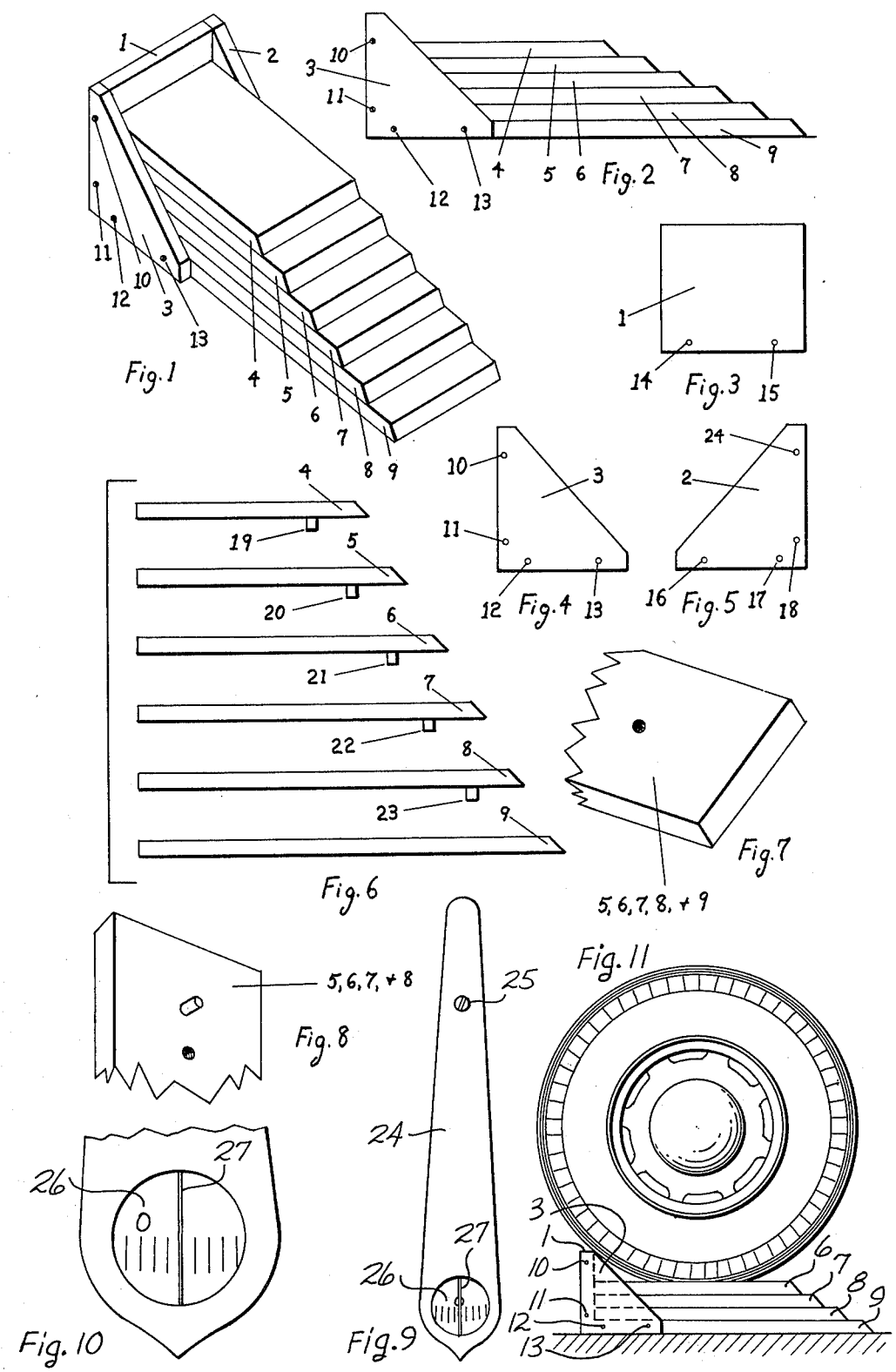

LEVELING APPARATUS

RELATED APPLICATION

This application is a continuation-in-part of my pending application Ser. No. 285,530, filed July 21, 1981, now abandoned and entitled Leveling Ramp.

TECHNICAL FIELD

My invention relates to the provision of an adjustable height leveling ramp and inclinometer, and to a method of using such apparatus for leveling such vehicles as travel trailers, motor homes, and pickup trucks carrying campers.

BACKGROUND ART

Adjustable height ramp structures, for elevating the wheel of a vehicle, are shown by U.S. Pat. No. 1,922,551, granted Aug. 15, 1933, to Marshall K. McCosh; U.S. Pat. No. 2,675,210, granted Apr. 13, 1954, to Ernest E. Lowber; U.S. Pat. No. 3,295,829, granted Jan. 3, 1967 to Charles H. Tarr and U.S. Pat. No. 4,165,862, granted Aug. 28, 1979, to Steven A. Bennett.

DISCLOSURE OF THE INVENTION

The leveling ramp of the present invention is characterized by a main frame structure which comprises an elongated, generally rectangular bottom member, opposite side members connected to opposite sides of an end portion of the bottom member, and extending upwardly therefrom, and a vertical back wall or member interconnecting between the two side members. A plurality of ramp planks of a predetermined thickness are stackable on the frame, to determine the height of the ramp. Each successive plank, in the upward direction, is shorter than the one below it. The number of planks utilized determines the height of elevation of the wheel.

In accordance with an aspect of the invention, an inclinometer is located within the vehicle and functions to measure the angle of inclination of the vehicle prior to the use of the ramp structure for leveling the vehicle. The inclinometer may be a simple pendulum type device which is pivotally connected at its upper end to a wall of the vehicle and which carries a vertical sight line member at its lower end. A scale presenting angles of inclination or some other indicia are carried by a portion of the vehicle rearwardly of the sight line. When the vehicle is perfectly level by virtue of it being on a level surface, the vertical sight line is in registry with the "O" position on the angle scale. When the vehicle is parked on a sloping surface, the vehicle and the angle scale carried thereby will deviate from a plum position, but the pendulum and the vertical sight line carried by it will remain plum. The angle of deviation or inclination can be easily read by viewing the angular difference in position between the angle gauge carried by the vehicle and the vertical sight line carried by the pendulum.

According to an aspect of the present invention, indicia is provided on the inclinometer and/or the ramp planks which of a type making it possible for the user to determine the number of planks needed by a direct reading of the inclinometer. The angle positions on the angle gauge may be set forth in numbers of planks, or may be calibrated in degrees of inclination, with the degrees of inclination correction provided by each plank being imprinted on the planks.

BRIEF DESCRIPTION OF THE DRAWINGS

The above general objects of my invention together with others inherent in the same, are attained by the mechanism illustrated in the accompanying drawings. Like reference numerals indicate like parts throughout the drawings:

FIG. 1 is an isometric view of an embodiment of the leveling ramp comprising a back member, two side members, five removable ramp planks, and a bottom member.

FIG. 2 is an elevational view of the leveling ramp.

FIG. 3 is an elevational view of the back member.

FIG. 4 is an elevational view of one of the side members.

FIG. 5 is an elevational view of the other side member.

FIG. 6 is an exploded side elevational view of the ramp planks and the bottom member.

FIG. 7 is a fragmentary isometric view taken from above and looking towards the front end of a plank member, showing the location of the hole in such members.

FIG. 8 is an isometric view looking towards the bottom of the front end of a ramp plank showing a dowel attached thereto and the location of a hole for receiving the dowel carried by the ramp plank above it.

FIG. 9 is an elevational view of a pendulum type inclinometer.

FIG. 10 is an enlarged scale fragmentary view of the scale region of the inclinometer, showing an inclination of three units.

FIG. 11 is a side elevational view of the leveling ramp in use.

BEST MODE FOR CARRYING OUT THE INVENTION

In preferred form, the leveling ramp of this invention comprises nine components. They are, a support base comprising a bottom member 9, a back member 1 and a pair of side members 2, 3, and five ramp planks 4, 5, 6, 7 and 8. The side members 2, 3 are attached to opposite sides of the bottom member 9, at one end of bottom member 9, and to back member 1. Back member 1 extends between and interconnects the outer ends of side members 2, 3. The ramp planks 4, 5, 6, 7 and 8 are stackable on the bottom member 9 and on each other.

The base structure may be constructed from wood members which are connected together by screws. For example, the back member 1 can be attached to the bottom member 9 by means of screws 14 and 15. The side member 2 may be attached to the back member 1 by means of screws 18 and 24. Side member 2 may be attached to the bottom section 9 by means of screws 16 and 17. In similar fashion, side member 3 may be attached to the back section 1 by means of screws 10 and 11. It may be secured to bottom member 9 by means of screws 12 and 13.

The rear ends of the ramp planks 4, 5, 6, 7 and 8 are snugly received within a receptacle formed by the back member 1 and the side members 2 and 3. The ramp planks may be connected together at their opposite ends by means of dowels and dowel openings.

Referring to FIG. 6, the dowel 23 which is attached to and depends downwardly from, ramp section 8 is inserted into a dowel opening formed in the bottom member 9. Dowel 22 which depends from ramp plank 7 is insertable into a dowel opening in ramp plank 8. Dowel 21 which depends from ramp plank 6 is insertable into a dowel opening located in ramp plank 7. Dowel 20 which depends from ramp plank 5 is insertable into a dowel opening located in ramp plank 6. A dowel 19 which depends from ramp plank 4 is insertable into a dowel opening located in ramp plank 5. FIG. 7 shows details of the dowel opening locations in the bottom member 9 and in the removable ramp planks 5, 6, 7 and 9. FIG. 8 shows the detail of the dowel receiving openings and dowel locations in removable sections 5, 6, 7 and 8.

In preferred form, the bottom member 9 and the removable ramp planks 4, 5, 6, 7 and 8 have front ends which are shaped to a forty-five degree angle measured from perpendicular. The bottom member 9 and the ramp planks 4, 5, 6, 7 and 8 are of graduated lengths, the shortest being the ramp plank 4 at the top of the leveling ramp and the longest being the bottom member 9. The graduated lengths combine with the forty-five degree angle of the front ends to provide and form a gradual incline (FIG. 2) when the ramp planks 4, 5, 6, 7 and 8 are placed one upon the other and on the bottom section 9, with their rear ends substantially abutted against back wall 1. Th gradual incline, thusly formed, facilitates the rolling motion of the wheel of a travel trailer or the like to the top of the leveling ramp. The forty-five degree angle of the front ends of the ramp planks 4, 5, 6, 7 and 8, and of bottom member 9, assures strength of the sections that a more acute angle would not and also facilitates fabrication of the leveling ramp from wood with the use of common woodworking tools.

Side members 2 and 3 provide support and structural strength for back member 1 and provide a means of vertical alignment of the sides of the back ends of ramp planks 4, 5, 6, 7 and 8. Back member 1 provides a means of vertical alignment of the back ends of the ramp planks 4, 5, 6, 7 and 8. Preferably, the back member 1 always projects upwardly above the uppermost ramp section, to provide a stop to the rolling motion of the wheel of the vehicle as the wheel rolls to the top of the leveling ramp and towards the back of the same. The dowels 19, 20, 21, 22 and 23 and the dowel openings in which they are received, provide a means of vertical alignment of the sides of the front ends of the ramp planks 4, 5, 6, 7 and 8, with each other and with the bottom member 9.

All of the above features of my invention are interdependent. Combined, they provide a convenient and expedicious means of leveling a travel trailer or other vehicle by means of the leveling ramp of adjustable height accomplished by the removal or addition of the removable sections. The leveling of the travel trailer is further expedited by use of indicia on the top of each ramp plank which represents the amount of change of angle of the axle of the vehicle measured to the horizontal that would result when one wheel of the vehicle is rolled onto the top of the leveling ramp when such ramp plank is the top plank on the leveling ramp. By use of this indicia printed on the ramp planks, in conjunction with corresponding indicia on the scale of an inclinometer mounted within the vehicle, the number of removable ramp planks to leave on the ramp to provide the ramp height required is quickly and accurately determined.

Referring to FIG. 9, the inclinometer may simply be in the form of a pendulum 24 which is pivotally mounted to a portion of the vehicle, such as by a single screw 25. The inclinometer may include a circular cutout 26 at its lower end in which a vertical sight line member 27, carried by the pendulum, is provided. A calibrated scale carried by the vehicle is provided behind the lower end portion of the pendulum 24, rearwardly of the sight line 25. When the vehicle is perfectly level by virtue of it being on a level surface, the vertical sight line 27 is in registry with the zero position on the angle scale. When the vehicle is parked on a sloping surface, the vehicle and the angle scale 26 carried thereby will deviate from a plum position, but the pendulum 24 and the vertical sight line 27 carried by it will remain plum. The angle of deviation or inclination can be easily read by viewing the angular difference in position between the zero position of the angle scale 26 carried by the vehicle and the vertical sight line 27 carried by the pendulum 24. The scale may be calibrated in degrees, number of ramp planks, etc. If degrees are used, the indicia placed on the top of each ramp planks 4, 5, 6, 7 and 8 may indicate the angles of correction that would be attainded if such ramp plank were to be the top member of the leveling ramp. Thus, the user would simply read the scale of the inclinometer and then remove ramp planks 4, 5, 6, 7, 8 until he reaches the ramp plank which has on its upper surface the degree indicia which is closest to the degree indicia on the inclinometer scale which is in line with the vertical sight member 27. If the inclinometer were to be calibrated in number of ramp planks, the user would start from the top of the leveling ramp and remove ramp planks until the number of ramp planks indicated by the inclinometer were left on the bottom member 9.

FIG. 11 shows the wheel of a vehicle up on a leveling ramp from which ramp planks 4 and 5 have been removed. It also shows the vehicle wheel in contact with the top of back member 1, with back member 1 serving to gauge the proper position of the wheel on the leveling ramp.

I claim:

1. An apparatus for leveling a vehicle by elevating a wheel of the vehicle, comprising:

a leveling ramp comprising a base frame including a bottom member, and a plurality of plank members of graduated lengths stackable on the bottom member, said plank members forming a gradual incline at one end of the ramp when stacked together and on the bottom member, with the height of the leveling ramp being adjustable by the removal or addition of one or more of the ramp planks, said base frame further including a pair of side members which are substantially shorter than the bottom member and which are connected to the bottom member at one end thereof, said side members projecting vertically upwardly, and a rear end member interconnected between said side members to form a three sided receptacle at the end of the bottom member in which rear end portions of the plank members are snugly received when they are stacked together and on the bottom member, said receptacle serving to hold the plank members in stacked position relative to each other and the bottom member at its end of the ramp, said rear end member always projects upwardly above the upper surface of the top plank member to serve as a wheel stop for the wheel of the vehicle which is driven up onto the leveling ramp.

2. An apparatus for leveling a vehicle according to claim 1, further including vertical dowl joint connection means connecting forward end portions of the ramp plank members together and to the bottom member.

3. An apparatus for leveling a vehicle according to claim 1, further including pendulum inclinometer means to be carried by the vehicle having scale indicia for indicating the amount that a vehicle is out of level prior to leveling of the vehicle, and indicia on the ramp plank members corresponding to indicia on the inclinometer, so that a user can read the pendulum inclinometer scale indicia and accordingly select the proper number of ramp plank members necessary to level the vehicle.

* * * * *